(12) United States Patent
Julian, Sr.

(10) Patent No.: US 7,341,507 B1
(45) Date of Patent: Mar. 11, 2008

(54) PORTABLE GAME SUPPORT

(76) Inventor: Isaac A. Julian, Sr., P.O. Box 133, Dulce, NM (US) 87528

( * ) Notice: Subject to any disclaimer, the term of this patent is extended or adjusted under 35 U.S.C. 154(b) by 0 days.

(21) Appl. No.: 11/398,895

(22) Filed: Apr. 7, 2006

(51) Int. Cl.
*A22C 17/00* (2006.01)
(52) U.S. Cl. ..................................... 452/192
(58) Field of Classification Search ............... None
See application file for complete search history.

(56) References Cited

U.S. PATENT DOCUMENTS

| | | | | |
|---|---|---|---|---|
| 4,977,643 | A | * | 12/1990 | Prysock .................. 452/187 |
| 5,049,110 | A | | 9/1991 | Owens |
| 5,562,534 | A | * | 10/1996 | McGough ................ 452/187 |
| 5,820,455 | A | * | 10/1998 | Breedlove ............... 452/187 |
| 6,045,442 | A | * | 4/2000 | Bounds .................. 452/187 |
| D424,270 | S | | 5/2000 | Barass et al. |
| 6,062,974 | A | * | 5/2000 | Williams ................ 452/187 |
| 6,695,688 | B1 | | 2/2004 | Owen et al. |
| 6,739,964 | B2 | * | 5/2004 | Gearhart ................ 452/187 |
| 6,994,618 | B1 | * | 2/2006 | Syers .................... 452/187 |

* cited by examiner

*Primary Examiner*—Thomas Price
(74) *Attorney, Agent, or Firm*—Crossley Patent Law; Mark Ashley Crossley

(57) ABSTRACT

A portable game support uses a frame made from horizontal, vertical and diagonal frame members. The frame members have opposite ends, and have attachment points on the ends. The attachment points are U-shaped connectors that have overlap and compression sections. The compression section has a connector port, or hole, through the section and the frame member. The connector can be a bolt, washers, and a nut, or a bolt and a cotter pin. The frame is supported against a vertical object through a pair of horizontal support straps having a first and a second opposite ends that have attachment points to matching attachment points where the straps are attached to the vertical frame member. The horizontal frame member can be four feet in length and the vertical and diagonal frame members can be three feet in length. The frame members can be formed from tubular metal. The horizontal frame member can have a D-ring with an attached pulley to assist in lifting the animal.

17 Claims, 4 Drawing Sheets

PORTABLE GAME SUPPORT

BACKGROUND OF THE INVENTION

Many offerings exist by which the game animal may be hung from various objects for field processing. The devices offered, however, do not solve all problems associated with ensuring the animal will be held securely and not be subject to external forces, such as wind. When the animal sways, then there is danger to the hunter from being struck by the animal, especially while using a knife. Additionally, when the animal sways, poor sanitary practices can occur.

FIELD OF THE INVENTION

The present invention relates to a portable game support for use in connection with processing game animals. The portable game support has particular utility in connection with field processing of the animal by holding the animal above the ground securely and safely. Additionally, reducing lateral movement, decreases the probability of the animal swaying, then the possibility that exists that the animal will be processed ineffectively, which can lead to infection from bacteria released from the animal, is reduced.

DESCRIPTION OF THE PRIOR ART

The use of portable game hangers is known in the prior art. For example, U.S. Pat. No. 5,820,455 to Breedlove discloses a portable animal hoist. However, the Breedlove '455 patent does not provide two fastening devices for securing the device to a tree, and has further drawbacks of requiring the teeth of the lower support device to grip into the tree to aid in resisting lateral forces.

U.S. Pat. No. 6,695,688 to Owen et al. discloses a "tree winch" portable game hoist that is attached to a tree to facilitate processing the animal. However, the Owens '688 patent does not provide the lateral support of the present device, and additionally does not provide the ability to choose an end pulley as desired.

While the above-described devices fulfill their respective and particular objects and requirements, they do not describe a portable game support that provides for the advantages of the present invention; therefore, a need exists for an improved portable game support, particularly one that includes reduced lateral movement, ease of set-up and light weight construction, and the ability of the end user to choose the lifting mechanism that best suits his individual needs.

In this respect, the present invention substantially departs from the conventional concepts and designs of the prior art.

SUMMARY OF THE INVENTION

In view of the foregoing disadvantages inherent in the known types of portable game hoists now present in the prior art, the present invention provides an improved portable game support, and overcomes the above-mentioned disadvantages and drawbacks of the prior art. As such, the general purpose of the present invention, which will be described subsequently in greater detail, is to provide a new and improved portable game support which has all the advantages of the prior art mentioned heretofore and many novel features that result in a portable game support which is not anticipated, rendered obvious, suggested, or even implied by the prior art, either alone or in any combination thereof.

To attain this, the present invention essentially comprises a game animal support that is formed from a horizontal frame member, a vertical frame member, and a diagonal frame member. The horizontal frame member, vertical frame member and diagonal frame members have first and second opposite ends. The vertical frame member first end has an attachment point to the horizontal frame member first end. The diagonal frame member first end has an attachment point to the horizontal frame member second end and the diagonal frame member second end has an attachment point to the vertical frame member second end. The pair of horizontal support members are attached to the vertical frame member, and are adjustable to support the portable game support. The horizontal support members can be ratchet straps that are tightened or loosened to fit the tree or post.

The horizontal frame member second end can have a pulley attachment point, such as a D-ring or an eyebolt, and the pulley attachment point can have an attached pulley. The attachment points can be U-shaped connectors that have an overlap section and a compression section, where the compression section would have a connector such as a bolt, a flat washer, a lock washer, and a nut, and a hole through the compression section and also through the frame where the compression section overlaps.

There has thus been outlined, rather broadly, the more important features of the invention in order that the detailed description thereof that follows may be better understood and in order that the present contribution to the art may be better appreciated.

The invention may also include the connector being a bolt having a hole at the other end and a cotter pin sized to fit within the hole to keep the bolt secure and inserted. There are, of course, additional features of the invention that will be described hereinafter and which will form the subject matter of the claims attached.

It is therefore an object of the present invention to provide a new and improved portable game support that has all of the advantages of the prior art portable game hoists and none of the disadvantages.

It is another object of the present invention to provide a new and improved portable game support that may be easily and efficiently manufactured and marketed.

An even further object of the present invention is to provide a new and improved portable game support that has a low cost of manufacture with regard to both materials and labor, and which accordingly is then susceptible of low prices of sale to the consuming public, thereby making such portable game support economically available to the buying public.

Still another object of the present invention is to provide a new portable game support that provides in the apparatuses and methods of the prior art some of the advantages thereof, while simultaneously overcoming some of the disadvantages normally associated therewith.

Even still another object of the present invention is to provide a portable game support for increased safety while field processing game. This allows the game to be processed with decreased concern for bacterial infection from improper sanitary conditions.

Still yet another object of the present invention is to provide a portable game support for improved lateral support. This makes it possible to reduce sway caused by wind or other environmental factors.

Thus has been broadly outlined the more important features of the portable game support so that the detailed description thereof that follows may be better understood and in order that the present contribution to the art may be better appreciated.

Numerous objects, features and advantages of the portable game support will be readily apparent to those of ordinary skill in the art upon reading the following detailed description of presently preferred, but nonetheless illustrative, embodiments of the portable game support when taken in conjunction with the accompanying drawings. In this respect, before explaining the current embodiments of the portable game support in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the portable game support. It is therefore important that the claims be regarded as including such equivalent constructions insofar as they do not depart from the spirit and scope of the present invention.

These together with additional objects of the portable game support, along with various novel features that characterize the invention are particularly pointed out in the claims forming a part of this disclosure. For better understanding of the portable game support, its operating advantages and specific objects attained by its uses, refer to the accompanying drawings and description.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numbers refer to the same parts throughout the various figures.

DETAILED DESCRIPTION OF THE PREFERRED EMBODIMENT

Figure 1:
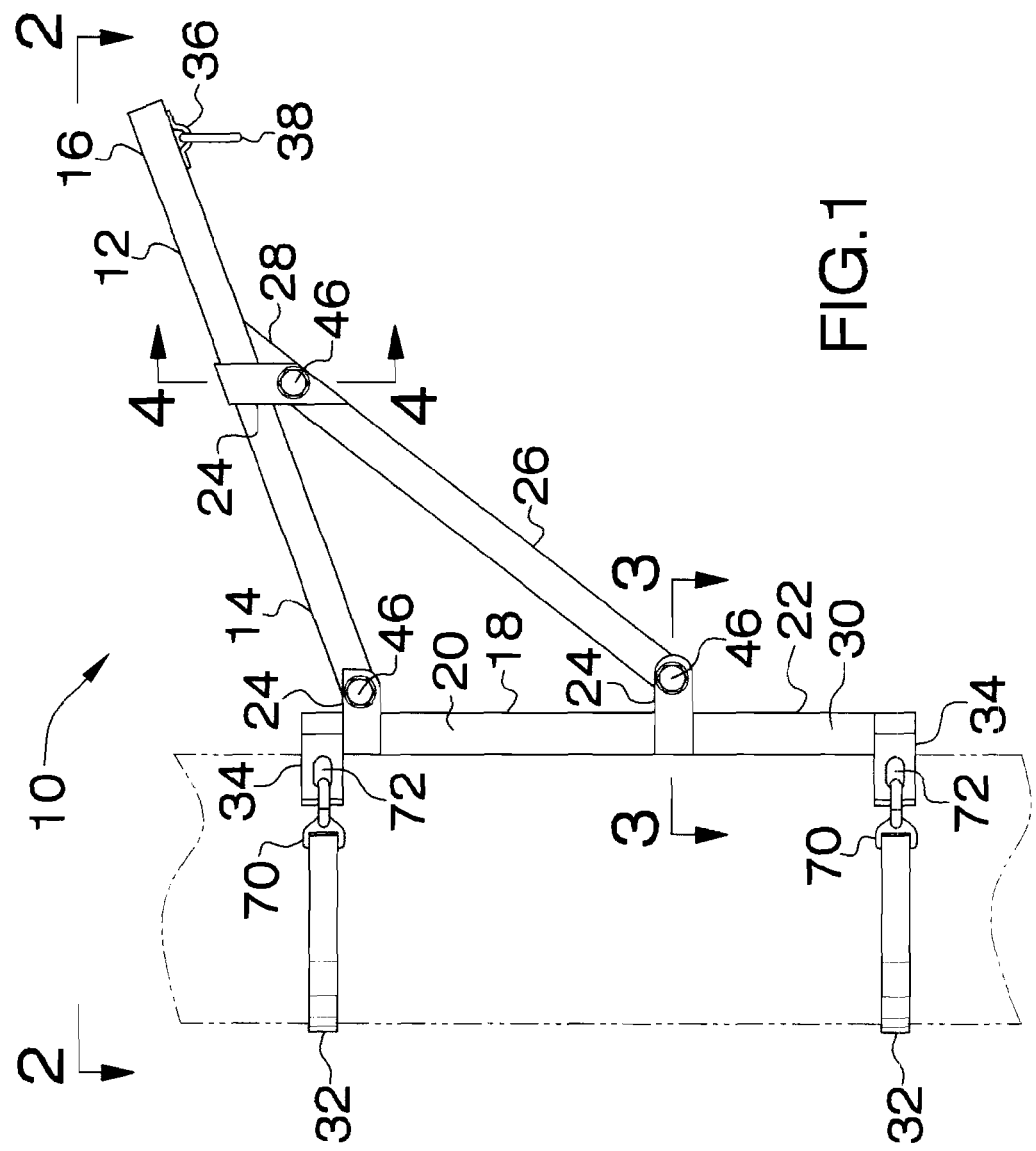
FIG. 1 is a side view of the preferred embodiment of the portable game support constructed in accordance with the principles of the present invention.

Referring now to the drawings, a preferred embodiment of the portable game support of the present invention is shown and generally designated by the reference numeral 10.

In FIG. 1, a new and improved portable game support 10 of the present invention for hanging game for field processing is illustrated and will be described. More particularly, the portable game support 10 has a horizontal frame member 12, a vertical frame member 18 and a diagonal frame member 26. The horizontal frame member 12 has a first end 14 and a second end 16. The vertical frame member 18 has a first end 20 and a second end 22. The diagonal frame member 26 has a first end 28 and a second end 30. The vertical frame member first end 20 has an attachment point 24 to the horizontal frame member first end 14. The diagonal frame member first end 28 has an attachment point 24 to the horizontal frame member second end 16 and the diagonal frame member second end 30 has an attachment point 24 to the vertical frame member second end 22. There are a pair of horizontal support members 32 having an attachment means 34 to the vertical frame member 18, the horizontal support members 32 being adjustable to support the portable game support. The pair of horizontal support members 32 can be straps 64 that have a first end 66 and a second opposite end 68, the opposite strap ends 66 and 68 have an attachment means 70 to a matching attachment means 72 on the attachment 34 on the vertical frame member 18. The attachment means 70 can be hooks that attach to the matching attachment means 72, which would be slots that the hooks would engage. The attachment points 24 can be U-shaped connectors 40 that have an overlap section 42 and a compression section 44, wherein the compression section 44 can have a connector 46 and a connector port 48, the connector port 48 has first end 50 and an opposite second end 52 and is defined by a port-confining wall 54. The connector 46 can be an externally threaded bolt 56, a flat washer 58, a lock washer 60, and an internally threaded nut 62.

Figure 2:
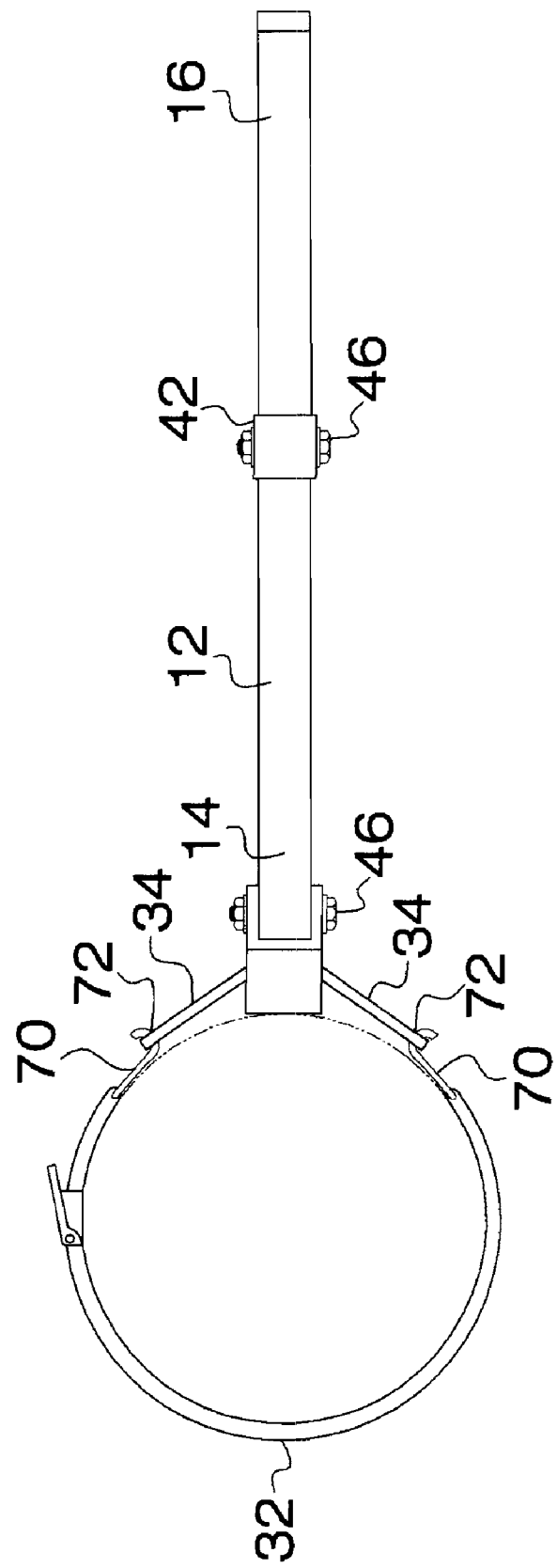
FIG. 2 is a top view of the portable game support, taken essentially along the lines 2-2 of FIG. 1.

FIG. 2 is a top view of the portable game support, taken essentially along the lines 2-2 of FIG. 1. The horizontal frame member 12 has a first end 14 and a second end 16. The attachment points 24 can be U-shaped connectors 40 that have an overlap section 42 and a compression section 44. There are a pair of horizontal support members 32 having an attachment means 34 to the vertical frame member 18, the horizontal support members 32 being adjustable to support the portable game support. The pair of horizontal support members 32 can be straps 64 that have a first end 66 and a second opposite end 68, the opposite strap ends 66 and 68 have an attachment means 70 to a matching attachment means 72 on the attachment 34 on the vertical frame member 18. The attachment means 70 can be hooks that attach to the matching attachment means 72, which would be slots 72 that the hooks 70 would engage.

Figure 3:
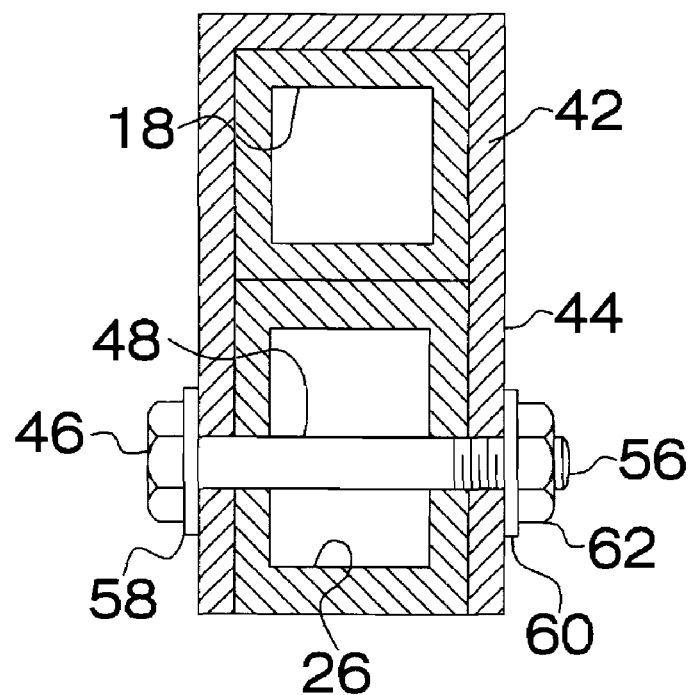
FIG. 3 is a cross sectional view of the portable game support, taken essentially along the lines 3-3 of FIG. 1, and showing the diagonal frame member attachment to the vertical frame member.

FIG. 3 is a cross sectional view of the portable game support, taken essentially along the lines 3-3 of FIG. 1, and showing the diagonal frame member 26 attachment to the vertical frame member 18. The attachment points 24 can be U-shaped connectors 40 that have an overlap section 42 and a compression section 44, wherein the compression section 44 can have a connector 46 and a connector port 48. The connector port 48 has a first end 50 and an opposite second end 52 and is defined by a port-confining wall 54. The connector 46 can be an externally threaded bolt 56, a flat washer 58, a lock washer 60, and an internally threaded nut 62.

Figure 4:
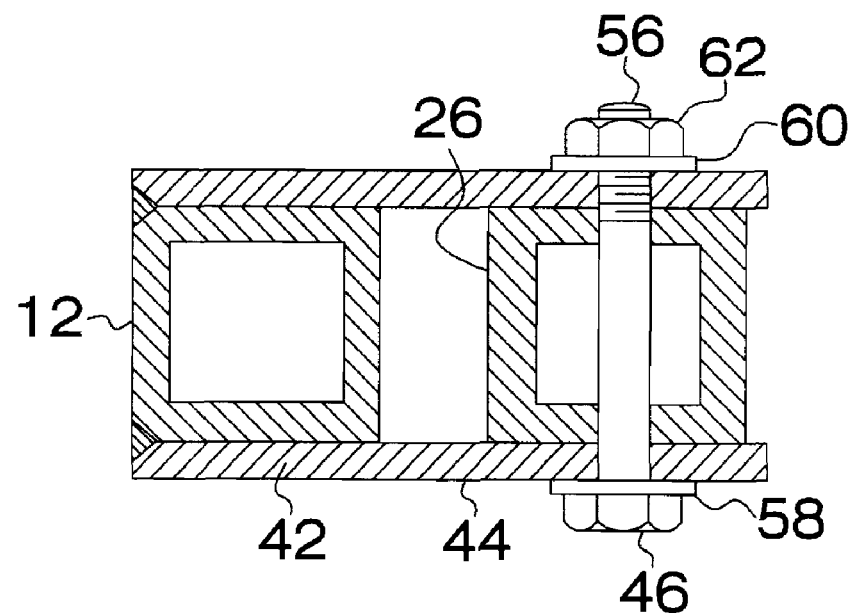
FIG. 4 is a cross sectional view of the portable game support, taken essentially along the lines 4-4 of FIG. 1, and showing the diagonal frame member attachment to the horizontal frame member.

FIG. 4 is a cross sectional view of the portable game support, taken essentially along the lines 4-4 of FIG. 1, and showing the diagonal frame member 26 attachment point 24 to the horizontal frame member 12. The attachment points 24 can be U-shaped connectors 40 that have an overlap section 42 and a compression section 44, wherein the compression section 44 can have a connector 46 and a connector port 48. The connector port 48 has first end 50 and an opposite second end 52 and is defined by a port-confining wall 54. The connector 46 can be an externally threaded bolt 56, a flat washer 58, a lock washer 60, and an internally threaded nut 62.

Figure 5:
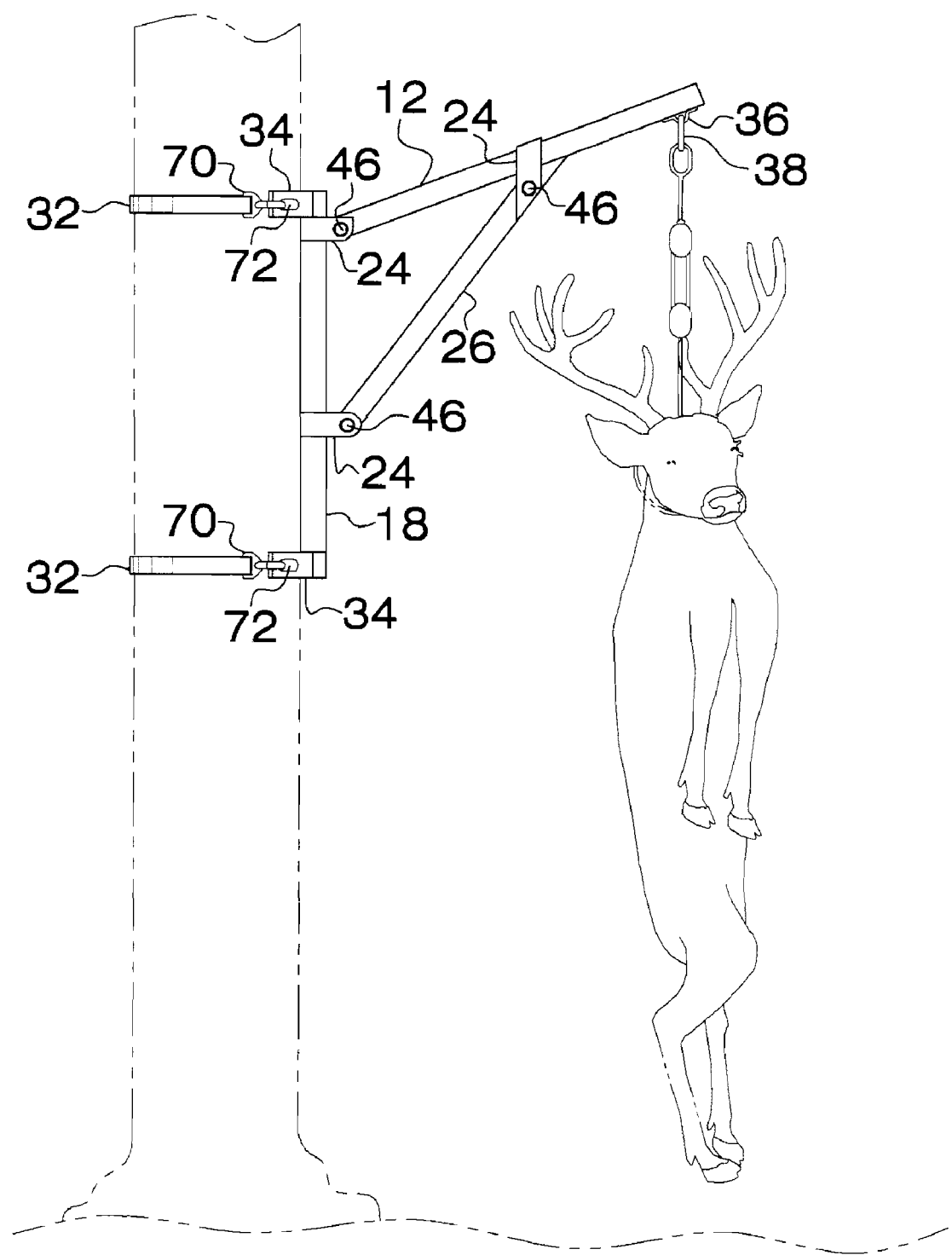
FIG. 5 is a perspective view of the portable game support, showing the device in use.

FIG. 5 is a perspective view of the portable game support, showing the device in use. The horizontal frame member 12 has a first end 14 and a second end 16. The vertical frame member 18 has a first end 20 and a second end 22. The diagonal frame member 26 has a first end 28 and a second end 30. The vertical frame member first end 20 has an attachment point 24 to the horizontal frame member first end 14. The diagonal frame member first end 28 has an attachment point 24 to the horizontal frame member second end 16 and the diagonal frame member second end 30 has an attachment point 24 to the vertical frame member second end 22. The pair of horizontal support members 32 would have attachment means 34 to the vertical frame member 18, and are adjustable to support the portable game support. The pair of horizontal support members 32 can be straps 56 that have a first end 58 and a second opposite end 60 with attachment points 62 to matching attachment points 64 at the strap attachment point to the vertical frame member. The horizontal frame member second end 16 can have a pulley attachment point 36, and the pulley attachment point 36 can have an attached pulley support 38. The pulley attachment point 36 can be a D-ring or an eyebolt. The attachment points 24 can be U-shaped connectors 40 that have an overlap section 42 and a compression section 44, wherein the compression section 44 can have a connector 46 and a connector port 48. The connector port 48 has a first end 50 and an opposite second end 52, and is defined by a port-confining wall 54. The connector 46 can be an externally threaded bolt 56, a flat washer 58, a lock washer 60, and an internally threaded nut 62, as shown.

The support is formed from a horizontal frame member, a vertical frame member, and a diagonal frame member. The horizontal, vertical, and diagonal frame members have first and second opposite ends. The vertical frame member first end has an attachment point to the horizontal frame member first end. The diagonal frame member first end has an attachment point to the horizontal frame member second end and the diagonal frame member second end has an attachment point to the vertical frame member second end. The pair of horizontal support members are attached to the vertical frame member, and are adjustable to support the portable game support. The pair of horizontal support members can be straps that have first and second opposite ends with attachment points to matching attachment points at the strap attachment point to the vertical frame member. The horizontal frame member second end can have a pulley attachment point, such as a D-ring or eyebolt, and the pulley attachment point can have an attached pulley. The attachment points can be U-shaped connectors that have an overlap section and a compression section, wherein the compression section can have a connector and a connector port, the connector port has opposite first and second ends and being defined by a port-confining wall. The connector can be an externally threaded bolt, a flat washer, a lock washer, and an internally threaded nut, or a bolt and cotter pin assembly.

In use, it can now be understood that the support is formed from horizontal, vertical, and diagonal frame members. The frame members have first and second ends where the frames are attached. The portable game support uses a pair of horizontal support members attached to the vertical frame member, and are adjustable to support the frame to the tree or post. The pair of horizontal support members can be ratchet straps that have hooks that attach to matching slots on the strap attachment area of the vertical frame member. The horizontal frame member second end can have a pulley attachment point, such as a D-ring or eyebolt, and can have an attached pulley. The attachment points can be U-shaped connectors that have an overlap section and a compression section. The compression section can have a connector and a connector port. The connector port has opposite first and second ends and being defined by a port-confining wall. The connector can be a bolt, a series of washers, and a nut, or a bolt and cotter pin assembly.

While a preferred embodiment of the portable game support has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable game support comprising:
   a horizontal frame member having a first and a second opposite ends;
   a vertical frame member having a first and a second opposite ends, said vertical frame member first end having an attachment point to said horizontal frame member first end;
   a diagonal frame member having a first and a second opposite ends, said diagonal frame member first end having an attachment point to said horizontal frame member second end and said diagonal frame member second end having an attachment point to said vertical frame member second end;
   a pair of horizontal support members having an attachment means to said vertical frame member, said horizontal support members being adjustable to encircle objects of varying girth,
   wherein said horizontal frame member second end has a pulley attachment point chosen from a D-ring or an eyebolt,
   wherein said pulley attachment point has an attached pulley, and
   wherein said attachment points are U-shaped connectors that have an overlap section and a compression section, wherein said compression section has a connector and a connector port, said connector port having opposite first and second ends and being defined by a port-confining wall.

2. The portable game support of claim 1 wherein said connector is an externally threaded bolt, a flat washer, a lock washer, and an internally threaded nut or a bolt having a connector port, said connector port having opposite first and second ends and being defined by a port-confining wall and a cotter pin sized to fit within said connector port.

3. The portable game support of claim 2 wherein said pair of horizontal support members are straps having a first and a second opposite ends said opposite ends have an attachment means to a matching attachment means on said attachment to said vertical frame member.

4. The portable game support of claim 2 wherein said horizontal frame member is four feet in length and said vertical frame member and said diagonal frame member are three feet in length.

5. The portable game support of claim 2 wherein said horizontal frame member, said vertical frame member, and said diagonal frame member are tubular metal.

6. A portable game support comprising:
a horizontal frame member having a first and a second opposite ends;
a vertical frame member having a first and a second opposite ends, said vertical frame member first end having an attachment point to said horizontal frame member first end, wherein said attachment points are U-shaped connectors that have an overlap section and a compression section, wherein said compression section has a connector and a connector port, said connector port having opposite first and second ends and being defined by a port-confining wall;
a diagonal frame member having a first and a second opposite ends, said diagonal frame member first end having an attachment point to said horizontal frame member second end and said diagonal frame member second end having an attachment point to said vertical frame member second end, wherein said attachment points are U-shaped connectors that have an overlap section and a compression section, wherein said compression section has a connector and a connector port, said connector port having opposite first and second ends and being defined by a port-confining wall;
a pair of horizontal support members having an attachment means to said vertical frame member, said horizontal support members being adjustable to encircle objects of varying girth.

7. The portable game support of claim 6 wherein said horizontal frame member second end has a pulley attachment point chosen from a D-ring or an eyebolt.

8. The portable game support of claim 7 wherein said pulley attachment point has an attached pulley.

9. The portable game support of claim 6 wherein said connector is an externally threaded bolt, a flat washer, a lock washer, and an internally threaded nut or a bolt having a connector port, said connector port having opposite first and second ends and being defined by a port-confining wall and a cotter pin sized to fit within said connector port.

10. The portable game support of claim 6 wherein said pair of horizontal support members are straps having a first and a second opposite ends said opposite ends have an attachment means to a matching attachment means on said attachment to said vertical frame member.

11. The portable game support of claim 6 wherein said horizontal frame member is four feet in length and said vertical frame member and said diagonal frame member are three feet in length.

12. The portable game support of claim 6 wherein said horizontal frame member, said vertical frame member are tubular metal, and said diagonal frame member.

13. A portable game support comprising:
a horizontal frame member having a first and a second opposite ends, wherein said horizontal frame member second end has a pulley attachment point chosen from a D-ring or an eyebolt, wherein said pulley attachment point has an attached pulley;
a vertical frame member having a first and a second opposite ends, said vertical frame member first end having an attachment point to said horizontal frame member first end, wherein said attachment points are U-shaped connectors that have an overlap section and a compression section, wherein said compression section has a connector and a connector port, said connector port having opposite first and second ends and being defined by a port-confining wall;
a diagonal frame member having a first and a second opposite ends, said diagonal frame member first end having an attachment point to said horizontal frame member second end and said diagonal frame member second end having an attachment point to said vertical frame member second end, wherein said attachment points are U-shaped connectors that have an overlap section and a compression section, wherein said compression section has a connector and a connector port, said connector port having opposite first and second ends and being defined by a port-confining wall;
a pair of horizontal support members having an attachment means to said vertical frame member, said horizontal support members being adjustable to encircle objects of varying girth.

14. The portable game support of claim 13 wherein said connector is an externally threaded bolt, a flat washer, a lock washer, and an internally threaded nut or a bolt having a connector port, said connector port having opposite first and second ends and being defined by a port-confining wall and a cotter pin sized to fit within said connector port.

15. The portable game support of claim 13 wherein said pair of horizontal support members are straps having a first and a second opposite ends said opposite ends have an attachment means to a matching attachment means on said attachment to said vertical frame member.

16. The portable game support of claim 13 wherein said horizontal frame member is four feet in length and said vertical frame member and said diagonal frame member are three feet in length.

17. The portable game support of claim 13 wherein said horizontal frame member, said vertical frame member, and said diagonal frame member are tubular metal.

* * * * *